(12) United States Patent
Lovett et al.

(10) Patent No.: US 8,544,250 B2
(45) Date of Patent: Oct. 1, 2013

(54) DRAPER PLATFORM WITH CENTER CONVEYOR AND METHOD OF REPLACING THE CENTER CONVEYOR BELT

(75) Inventors: Benjamin M. Lovett, Colona, IL (US); Benjamin J. Schlesser, Bettendorf, IA (US); Bruce A. Coers, Hillsdale, IL (US); Austin William Hughes, Kaysville, UT (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/280,762

(22) Filed: Oct. 25, 2011

(65) Prior Publication Data
US 2013/0097986 A1    Apr. 25, 2013

(51) Int. Cl.
*A01D 43/00*    (2006.01)
(52) U.S. Cl.
USPC ............................................. 56/153; 56/181
(58) Field of Classification Search
USPC .................................. 56/153, 181, 364, 208
See application file for complete search history.

(56) References Cited

U.S. PATENT DOCUMENTS

| RE35,543 | E * | 7/1997 | Patterson ..................... 56/14.4 |
| 6,202,397 | B1 * | 3/2001 | Watts et al. .................... 56/208 |
| 7,281,365 | B2 * | 10/2007 | Zurn et al. ..................... 56/181 |
| 7,650,736 | B1 * | 1/2010 | Salley et al. ................... 56/181 |
| 7,805,917 | B2 * | 10/2010 | Kempf et al. .................. 56/181 |
| 2005/0022491 | A1 * | 2/2005 | Zurn et al. ................. 56/16.4 R |
| 2006/0254241 | A1 * | 11/2006 | Kempf et al. ................. 56/16.6 |
| 2007/0193243 | A1 * | 8/2007 | Schmidt et al. ................. 56/181 |
| 2008/0161077 | A1 * | 7/2008 | Honey .......................... 460/106 |
| 2010/0011729 | A1 * | 1/2010 | Salley et al. ................... 56/14.5 |

* cited by examiner

*Primary Examiner* — Árpád Fábián-Kovács (57) ABSTRACT

A draper platform (100) has a center endless belt conveyor (118) that is supported on and between first and second adjacent support arms (246A, 246B). The center endless belt conveyor (118) is releasable from a first support arm (246A) of the two adjacent support arms to pivot downward away from the first support arm of the two adjacent support arms a distance sufficient to slidably remove an endless conveyor belt (134) from the center endless belt conveyor in a direction parallel to the axes of rotation of the rolls (300, 302) that support the endless conveyor belt.

13 Claims, 7 Drawing Sheets

DRAPER PLATFORM WITH CENTER CONVEYOR AND METHOD OF REPLACING THE CENTER CONVEYOR BELT

FIELD OF THE INVENTION

The present invention relates to agricultural combine harvesting machinery, and more particularly to draper platforms. Even more particularly it refers to center conveyors for such draper platforms.

BACKGROUND OF THE INVENTION

Combines are large self-propelled vehicles used for harvesting and threshing agricultural crop in the field. A harvesting head is typically disposed across the front of the combine vehicle supported on a feederhouse. This harvesting head is configured to cut and convey the crop into the combine vehicle itself where it is threshed, separated, and cleaned.

Traditional harvesting heads included an elongate rigid frame to which harvesting implements are added such as cutter bars, row units, reciprocating knife assemblies, augers, reels, and endless belt conveyors. One such type of harvesting head is called a "draper platform" or "draper".

Draper platforms have an elongate frame on which are mounted left and right side endless belt conveyors mounted immediately behind a reciprocating knife. These endless conveyors convey cut crop material inward to a center portion of the draper platform, depositing them on a center conveyor that moves the cut crop material rearward. The center conveyor carries the material to and through an aperture at the rear of the draper platform frame, where it is deposited in an elevating conveyor called a feederhouse, which carries the cut crop material into the combine vehicle for threshing, separating and cleaning.

The belts on the center conveyor are typically formed of an elongate fabric belt having a plurality of lugs mounted thereon. As manufactured, these belts are flat, and not endless. The belts do have fittings disposed on opposing ends of the belt that permit the ends of the belt to be attached to each other to form an endless belt—e.g. a loop of fabric—once the belt is looped around the conveyor rollers and the free ends of the belt are brought together.

To do this, the existing damaged endless belt must be cut apart across its width or the conveyor belt fasteners removed, and then the entire length of the belt must be worked out around the rollers that support the center conveyor belt.

Once the damaged belt is removed, the new belt, also in flat form, must be drawn around and underneath the drive and idler rollers that support the belt, the free ends of the new belt must be pulled together, and then bolts and metal bars must be used to attach the loose ends together to form the endless belt (i.e. the loop).

This problem is further complicated by the need to work around the two side conveyors. The side conveyors extend over the top of the endless belt of the center conveyor thus making it even more difficult to insert the new belt.

The problem to be solved is that of providing a center conveyor that permits the quick replacement of the endless belt of the center conveyor when the endless belt needs replacement.

This problem is solved by the arrangement described in claim 1 (as filed) and by the method described in claim 8 (as filed). Further advantages are provided by additional claims that are dependent upon claim 1.

SUMMARY OF THE INVENTION

In accordance with a first embodiment of the invention, a draper platform is disclosed that has a direction of travel through a field and a leading edge, the draper platform comprising an elongate frame disposed to carry crop in a direction transverse to the direction of travel through the field; support arms pivotally coupled to the frame and extending forward therefrom; a reciprocating knife disposed at the leading edge of the draper platform and extending substantially the entire width of the draper platform; a left side conveyor disposed behind the reciprocating knife and supported on a first plurality of the support arms and having en endless belt disposed to carry crop from the left side of the draper platform to a central region of the draper platform; a right side conveyor disposed behind the reciprocating knife and supported on a second plurality of the support arms and having an endless belt disposed to carry crop from the right side of the draper platform to a central region of the draper platform: a center conveyor disposed between the left side conveyor and the right side conveyor and supported on two adjacent support arms, said center conveyor having an endless conveyor belt supported at least on front rear rollers, having respective parallel axes disposed transverse to the direction of travel, to carry crop in a direction opposite to the direction of travel; wherein the center conveyor is releasable from a first support arm of the two adjacent support arms to pivot downward away from the first support arm of the two adjacent support arms a distance sufficient to permit slidable removal of the endless conveyor belt from the center conveyor in a direction parallel to the axes of the front and rear rollers.

The center conveyor may be supported on the first support arm with first and second brackets, each of said first and second brackets comprising a first bracket member fixed to the first support arm, a second bracket member fixed to the center conveyor, and at least one removable coupling member coupling the first and second bracket members together.

The at least one coupling member may be receivable in both the first and second bracket members to hold the first and second bracket members together.

The second bracket member may be spaced apart from the first bracket member to pivot downward with respect to the first bracket member when the at least one coupling member is removed.

The center conveyor may be supported on the second support arm with third and fourth brackets, each of said third and fourth brackets comprising a third bracket member fixed to the second support arm, and a fourth bracket member fixed to the center conveyor, and further wherein the third and fourth bracket members are pivotally coupled to each other to permit the central conveyor to pivot with respect to the second support arm about a pivotal axis immediately adjacent to at least a portion of the third and fourth brackets.

The pivotal axis may pass through the third bracket and the fourth bracket.

The center conveyor may further comprise a belt tensioner disposed inside the loop of the endless conveyor belt, and further wherein the belt tensioner can release tension sufficient to remove the endless conveyor belt from the center conveyor by translating the endless conveyor belt in a direction parallel to the longitudinal extent of the at least two rollers a distance of at least the overall transverse width of the endless conveyor belt.

In accordance with a second embodiment of the invention, in a draper platform having a direction of travel, a left side and a right side, said draper platform comprising an elongate draper frame extending in a direction transverse to the direction of travel, said draper platform further comprising a left side conveyor, a right side conveyor, and a center conveyor, said left side, right side and center conveyors being supported on said draper frame, wherein said center conveyor is disposed between the left side conveyor and the right side conveyor to receive cut crop material from both the left side conveyor and the right side conveyor, wherein the center conveyor has two transversely opposed sides comprising a left side and a right side, wherein said center conveyor further comprises a conveyor frame, front roller and rear rollers supported on the conveyor frame and an endless belt supported on the front and rear rollers for recirculating movement about the front and rear rollers, wherein the front and rear rollers rotate about axes that extend parallel to the transverse extent of the frame, a method of replacing the endless belt is provided comprising the steps of releasing one side of the center conveyor from the draper frame, pivoting the center conveyor with respect to the draper frame about a pivotal axis that extends generally parallel to the direction of travel, and removing the endless belt.

The step of releasing one side may further comprise the step of completely disconnecting said one side of the center conveyor from the frame.

The step of removing the endless belt may further comprise the step of retracting the front roller toward the rear roller until tension is released in the endless belt.

The step of removing the endless belt may further comprise the step of sliding the endless belt completely off the rollers in a direction toward the first side of the center conveyor.

The step of pivoting the center conveyor may include the step of pivoting the center conveyor until the first side of the center conveyor clears the frame sufficient that the endless belt can be slid off the center conveyor rollers in a direction parallel to the axis of rotation of the rollers.

The step of pivoting the center conveyor may include the step of pivoting the center conveyor until the first side of the center conveyor clears the frame sufficient that the endless belt can be slid off the center conveyor rollers in a direction parallel to the axis of rotation of the rollers a distance at least as great as the overall width of the endless belt and in the direction parallel to the axis of rotation.

DETAILED DESCRIPTION OF THE PREFERRED EMBODIMENT

The terms "front", "in front of", "forward", "fore-and-aft", "rear", "behind", "rearward", and the like as used herein are made in reference to "V" (FIG. 1), which is the direction of travel through the field during normal, straight-line, harvesting operations. The direction of travel is horizontal and perpendicular to the longitudinal extent of the draper platform. The terms "transverse", "side-to-side", and the like refer to a direction generally parallel to the longitudinal extent of the draper. This direction is horizontal and transverse to the direction of travel "V" of the draper platform.

Below, the application describes the construction and operation of structures on the left side of the draper platform. The construction and operation of the right side of the draper platform is identical to the construction and operation of the left side of the draper platform in every respect, but is constructed as a mirror image of the left side.

Figure 1:
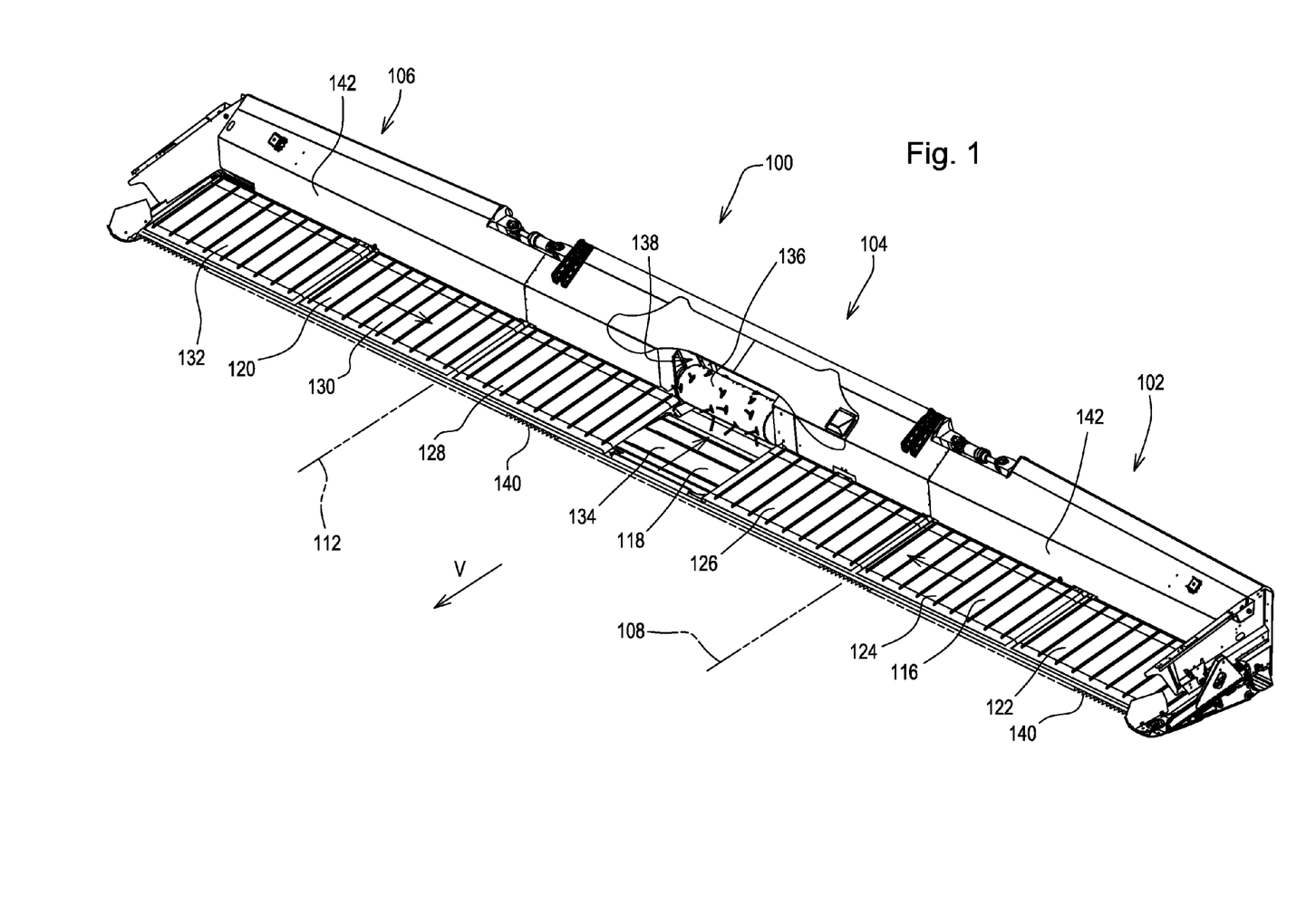
FIG. 1 is a perspective view of a draper platform in accordance with the present invention.
Figure 2:
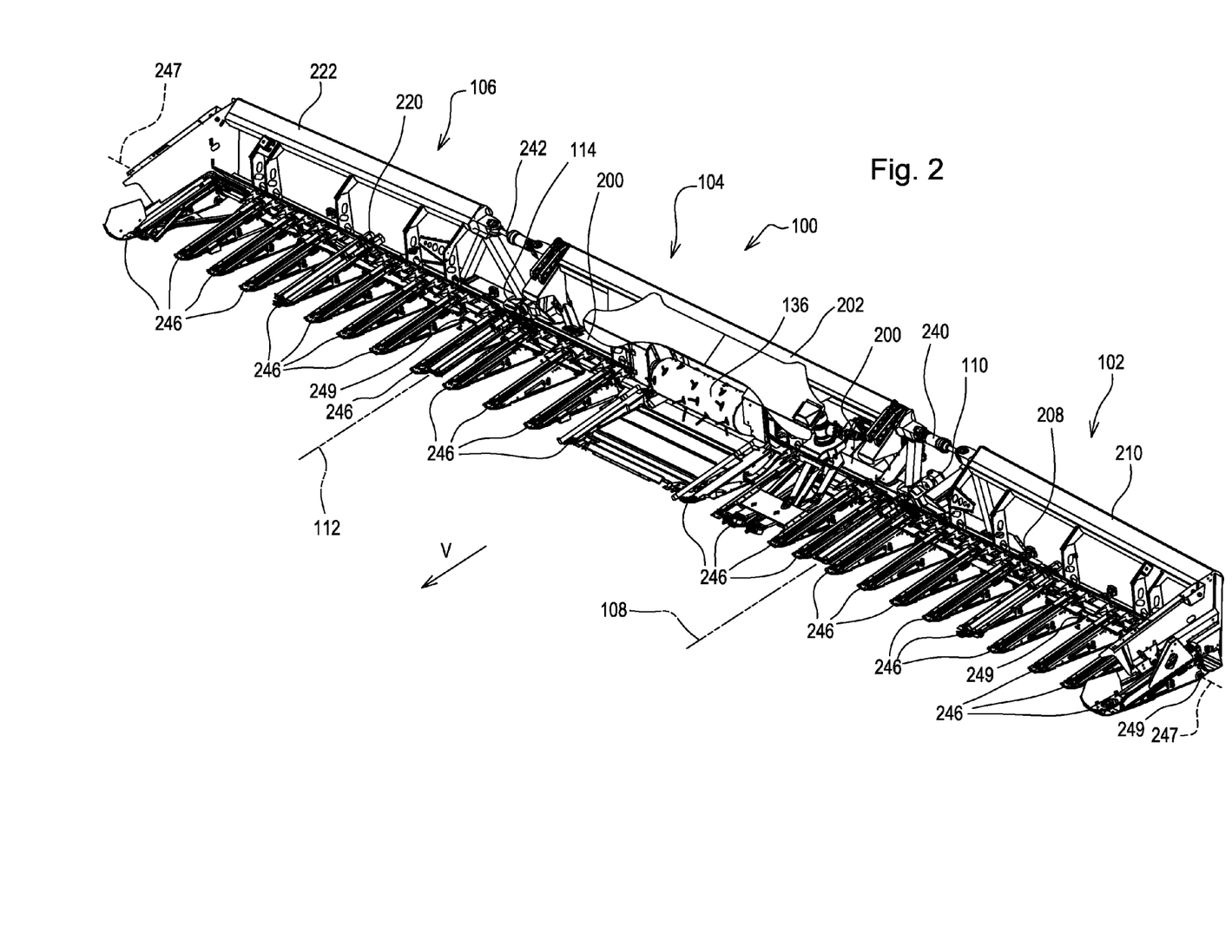
FIG. 2 is a perspective view of the draper platform of FIG. 1 with the conveyor belts and back sheets removed.

In FIGS. 1 and 2 a draper platform 100 is comprised of an elongate and laterally extending frame comprising a left frame section 102, a center frame section 104, and a right frame section 106. These three frame members are coupled to one another and extend linearly, laterally and horizontally in an end-to-end relationship. Left frame section 102 pivots about a generally horizontal and forwardly extending axis 108 with respect to center frame section 104. This axis is defined by pivot joint 110. Pivot joint 110 couples left frame section 102 and center frame section 104 together and constrains them to pivot about axis 108. Right frame section 106 pivots about a generally horizontal and forwardly extending axis 112 with respect to center frame section 104. This axis is defined by pivot joint 114. Pivot joint 114 couples right frame section 106 and center frame section 104 together and constrains them to pivot with respect to each other about axis 112. While shown here as three pivotally connected sections, in an alternative embodiment the pivot joints can be eliminated and the entire frame formed as one elongate rigid construction. This can be done by forming beams 200, 208, 220 as a single elongate beam, and forming beams 202, 210, 222 as a single elongate beam.

Draper platform 100 further comprises a left side endless belt conveyor 116, a center endless belt conveyor 118, and a right side endless belt conveyor 120. Left side endless belt conveyor 116 is comprised of three separate endless conveyor belts 122, 124, 128. Right side endless belt conveyor 120 is comprised of three separate endless conveyor belts 128, 130, 132. Endless conveyor belts 122, 124, 126, 128, 130, 132 have upper surfaces that are coplanar and are driven by motors (not shown) to carry cut crop material laterally inwardly in the direction (indicated by the arrows that are superimposed on the conveyors) toward the center portion of draper platform 100, where they deposit their cut crop material onto endless conveyor belt 134 of center endless belt conveyor 118. Endless conveyor belt 134 has laterally extending cleats 135 (FIG. 3) bonded thereto that engage and the crop and assist in dragging the crop. Endless conveyor belt 134 is driven by rotary drive motors 308 and 310 (described in further detail below) to carry cut crop material rearwardly in the direction indicated by the arrow superimposed on endless conveyor belt 134. Endless conveyor belt 134 carries the cut crop material rearward and underneath guide roller 136. Guide roller 136, in turn, carries the cut crop material rearward on the upwardly facing top surface of the center conveyor belt, and through central aperture 138 disposed in the rear wall of draper platform 100. Cut crop material passing through central aperture 138 is received in a feederhouse (not shown) of an agricultural combine (also not shown) in the conventional manner.

A reciprocating knife assembly 140 is disposed along the leading edge of the draper platform 100, and extends substantially the entire width of the draper platform. The reciprocating knife assembly 140 is configured to sever crop plants near their roots, permitting the severed portions of the crop plants to fall on the left side endless belt conveyor 116, on the center endless belt conveyor 118 and on the right side endless belt conveyor 120.

A reel (not shown) is disposed above the elongate reciprocating knife assembly 140 and is configured to engage the tops of the crop plants, gently pushing them rearward such that they fall onto endless belt conveyors 116, 118, and 120. The conveyors and the elongate reciprocating knife assembly are connected to and supported on support arms 246 (FIG. 2)

Back sheets 142 extend generally vertically from the rear edge of endless conveyor belts 122, 124, 126, 128, 130, 132. These back sheets serve as a backstop or barrier to prevent cut crop material from passing completely across draper platform 100 and falling on the ground. Back sheets 142 terminate at the central aperture 138 and define the opposing sides of central aperture 138.

As the draper platform travels over the ground, the ground presses upward on skid shoes mounted on the bottom of the reciprocating knife assembly 140 causing the elongate reciprocating knife assembly 140 to move up and down and flex independently along its length as the skids shoes drag along the ground following the undulating ground terrain. The elongate reciprocating knife assembly 140 is mounted at the leading edge of the draper platform on support arms 246 (FIG. 2). The support arms 246, in turn, pivot up and down to accommodate the flexing movement of the elongate reciprocating knife assembly 140.

In FIG. 2, back sheets 142 have been removed for ease of illustration, as have endless conveyor belts 122, 124, 126, 128, 130, and 132, and elongate reciprocating knife assembly 140.

Center frame section 104 comprises a horizontal and laterally extending beam 200 that is coupled to a horizontally and laterally extending beam 202. Beam 202 is parallel to and disposed above beam 200. Cross members couple beams 200, 202 together to provide a rectangular framework.

In a similar fashion, left frame section 102 is comprised of a horizontally and laterally extending beam 208 that is coupled to a horizontally and laterally extending beam 210. Beam 210 is parallel to and disposed above beam 208. Cross members extend between and couple beams 208, 210 together to form left frame section 102.

In a similar fashion, the frame of right frame section 106 is comprised of a horizontally and laterally extending beam 220 that is coupled to a horizontally and laterally extending beam 222. Beam 222 is parallel to and disposed above beam 220. Cross members extend between and couple beams 222, 220 together to form right frame section 106.

The left end of beam 200 and the right end of beam 208 are coupled together by a pivot joint 110. Pivot joint 110 couples together lower adjacent portions of left frame section 102 and center frame section 104.

The right end of beam 200 and the left end of beam 220 are coupled together by a pivot joint 114. Pivot joint 114 couples together lower adjacent portions of right frame section 106 and center frame section 104.

The left end of beam 202 and the right end of beam 210 are coupled together by an elongate member 240. Elongate member 240 couples together upper adjacent portions of left frame section 102 and center frame section 104.

The right end of beam 202 and the left end of beam 222 are coupled together by an elongate member 242. Elongate member 242 couples together upper adjacent portions of right frame section 106 and center frame section 104

A plurality (e.g. about 26) of conveyor support arms 246 are pivotally coupled to beams 200, 208, and 220 at the rear ends of arms 246 such that they can pivot up and down at the forward ends of arms 246 as the draper platform 100 travels through the agricultural field harvesting crops. Beams 200, 208, 220 extend substantially horizontally and transversely.

Conveyor support arms 246 are fixed to the elongate reciprocating knife assembly 140 (FIG. 1) at their forward ends. Elongate reciprocating knife assembly 140 is designed flexible enough that individual support arms 246 can move up and down with respect to adjacent support arms 246 as they follow the terrain of the agricultural field, and the elongate reciprocating knife assembly 140 can flex between these adjacent arms to permit this relative movement.

Support arms 246 are all disposed generally horizontally and extend forward and slightly downward from the rear pivot 249 where each arm 246 is coupled to the frame, to beams 200, 208, 220. Each support arm 246 has an associated pivot 249. The support arms 246 are spaced parallel to each other and each support arm is preferably spaced equidistant from its immediate adjacent support arms 246. The pivots 249 are aligned such that the support arms 246 pivot about a laterally extending and horizontal axis 247 that is generally parallel to the longitudinal extent of the draper platform 100.

Figure 3:
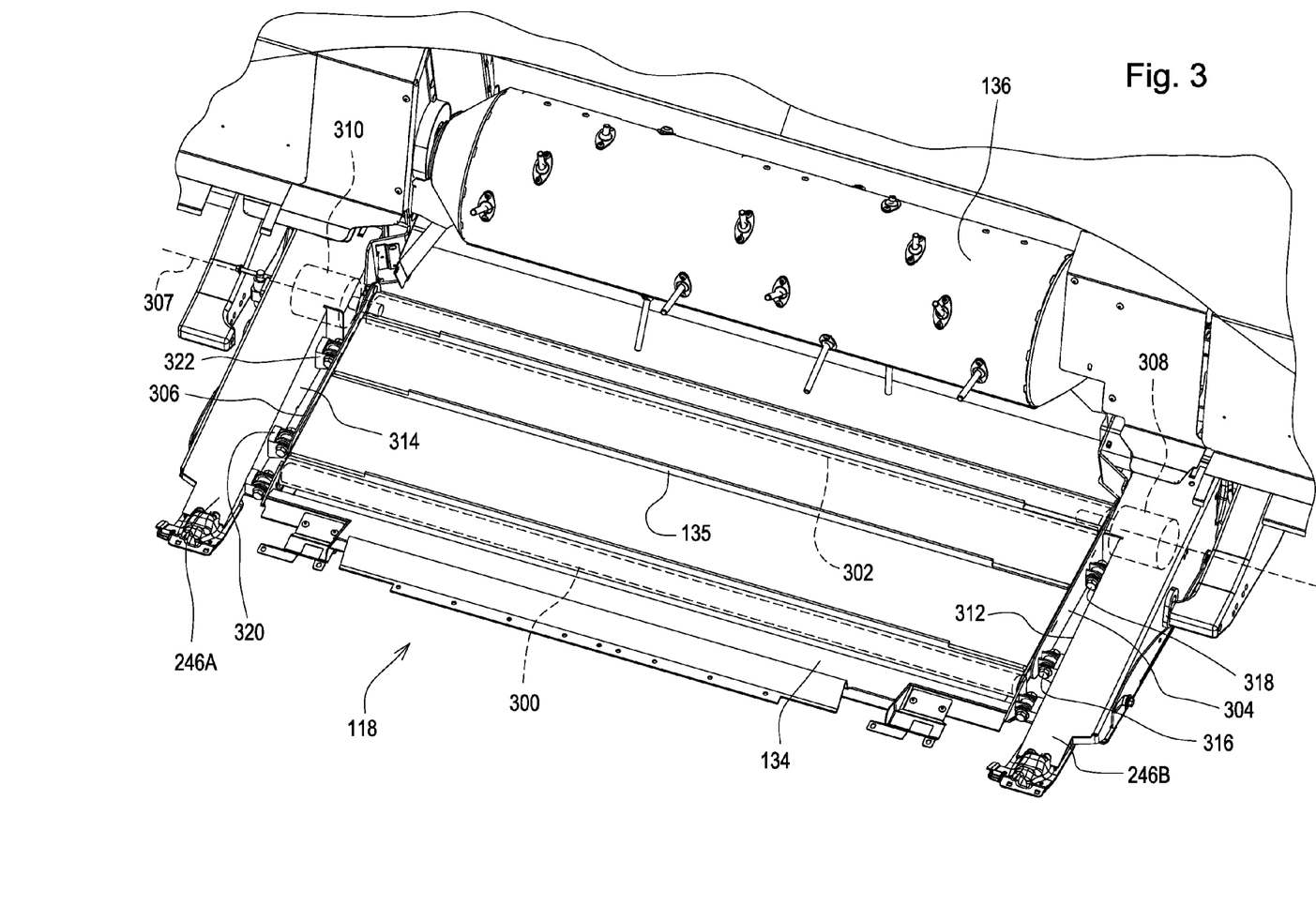
FIG. 3 is a fragmentary detail perspective view of the center region of the draper platform of FIGS. 1-2.

Referring now to FIG. 3, additional details of the center endless belt conveyor 118 can be seen. Center endless belt conveyor 118 has a front roller 300, a rear roller 302, and an endless conveyor belt 134 mounted to endlessly revolve around the two rollers.

The rollers are horizontal and extend transversely. The endless conveyor belt 134 is made of a thin woven fabric impregnated and covered with an elastomeric material. Elongated elastomeric cleats are formed in its upper surface to engage the crop material and help convey it to the guide roller 136.

The center endless belt conveyor 118 comprises two side plates including a left side plate 304 and a right side plate 306 that define the left and right edges of the center endless belt conveyor 118. The side plates are generally planar and extend vertically and longitudinally, generally parallel to the direction of travel "V" of the draper platform.

The two side plates 304, 306 are coupled to a support frame 502 (shown in FIG. 5) disposed inside the loop formed by the endless conveyor belt 134 and between the two side plates. This support frame 502 holds the two side plates in parallel to each other a fixed distance apart in the fixed relative positions illustrated herein. The support frame 502 also supports a belt tensioner 504 including a spring assembly 512 (described in further detail below) which spring-loads the front roller 300 with respect to rear roper 302 to maintain the endless conveyor belt 134 in tension for rotation about both rollers.

The rear roller 302 is supported for rotation on bearings fixed to the rear ends of the left and right side plates 304, 306. The rear roller 302 rotates such that its axis of rotation 307 passes through two apertures in the rear of the left and right side plates 304, 306.

Two rotary drive motors 308, 310 are mounted inside and mounted to the support arms 246A and 246B (shown in FIG. 2) that flank the center endless belt conveyor 118. The drive motors have rotating drive shafts that pass through apertures in the inner facing sidewalls 314, 312 of support arms 246A, 246B, respectively, and into the apertures in the rear of the side plates. These drive shafts are slidably received in opposing ends of the rear roller 302 to drive the rear roller 302 in rotation and thereby drive the endless conveyor belt 134.

Mounting brackets 316, 318, 320, 322 couple the center endless belt conveyor 118 to and between the support arms 246A and 246B, with the mounting brackets 316 and 318 defining a left mounting assembly, and with the mounting brackets 320 and 322 defining a right mounting assembly. The right and left mounting assemblies are alike and each defines a connection which is both disconnectable and downward movement permitting so as to permit one side of the conveyor 118 to be selectively disconnected from the arms 246A and 246B and be moved downwardly relative to the other side. Specifically, bracket 316 couples the forward end of the left side plate 304 to support arm 246A. Bracket 318 couples the rear end of the left side plate 304 to support arm 246A. Bracket 320 couples the forward end of the right side plate 308 to support arm 246B. Bracket 322 couples the rear end of the right side plate 306 to support arm 246B.

Thus the center endless belt conveyor 118 is supported on the four brackets and on the two motors.

The brackets 316, 318, 320 and 322 are constructed the same. For that reason we will only discuss the construction of bracket 320 which connects the right forward side of center endless belt conveyor 118 to support arm 246A (in FIG. 3).

Brackets 320 and 322 are mirror images of brackets 316 and 318. Brackets 316 and 318 are located in the identical places as the brackets 320, 322 but on support arm 246B instead of 246A.

Figure 4:
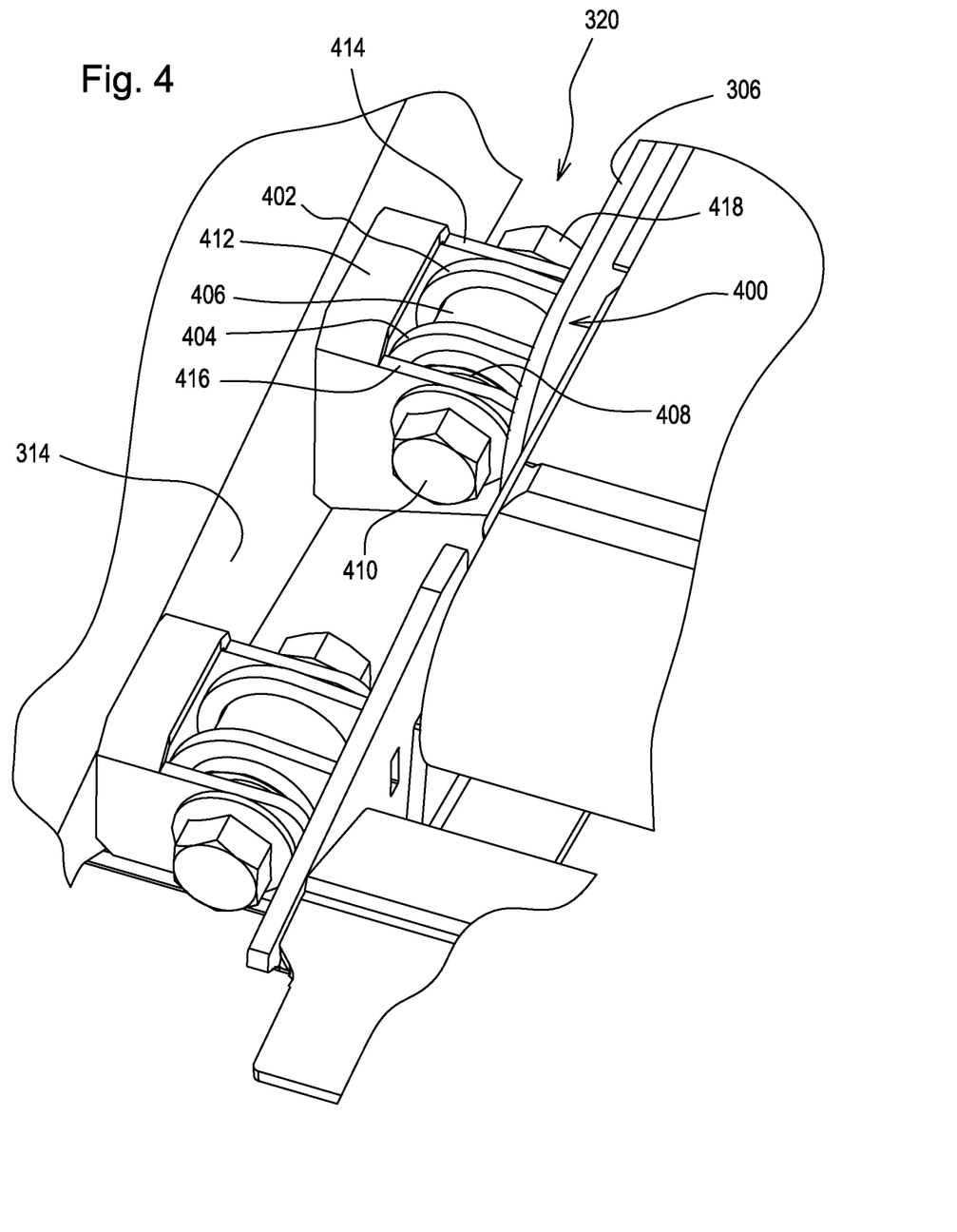
FIG. 4 is a fragmentary detail perspective view of the flexible couplers that mount the center conveyor to the support arms that support the reciprocating knife.

Referring to FIG. 4, bracket 320 comprises a first coupler 400 that is fixed to the outer surface of side plate 306. Coupler 400 extends to the right, away from side plate 306. Coupler 400 comprises two metal ears 402, 404, that extend generally vertically and laterally. A cylinder 406 that is hollow and right-circular extends between and is supported within ears 402, 404 in corresponding apertures formed in ears 402,404. Cylinder 406 is not fixed to ears 402, 404, but is free to slide slightly back and forth in the circular apertures formed in ears 402, 404.

An elastomeric bushing 408 that is right-circular and cylindrical is disposed inside and supported within cylinder 406. Elastomeric bushing 408 fits snugly within cylinder 406. It has a hole that is coaxial with its outer cylindrical surface that is sized to receive the shank of a bolt 410. This arrangement permits the bolt to translate in three orthogonal directions with respect to cylinder 406 and to rotate with respect to cylinder 406 about three orthogonal axes.

Bracket 320 also comprises a second coupler 412 that is fixed to the inner facing sidewall 314 of support arm 246A. Coupler 412 extends inwardly and to the left, away from the surface of inner facing sidewall 314 and toward side plate 306. Coupler 412 comprises two ears 414,416 that extend generally vertically and laterally and parallel to ears 402,404 of first coupler 400. Ears 414, 416 are spaced apart such that they receive ears 402, 404 therebetween. Apertures are provided in ears 414, 416 that are coaxial with the apertures in ears 402, 404. Apertures in ears 414, 416 have a smaller diameter just sufficient to receive the shank of bolt 410 with a running clearance and permit the shank to pass therethrough.

When the bracket 320 is assembled, the shank of bolt 410 passes entirely through the four ears and through the aperture in the elastomeric bushing 408 leaving enough of the shank extending out the far side (i.e. the side away from the head of bolt 410) to permit a locknut 418 to be secured thereto and thereby to prevent bolt 410 from falling out of the ears of bracket 320.

The elastomeric bushing 408 is the element that provides the resilience and flexibility to bracket 320. It is sized to permit support arm 246A to pivot up and down with respect to support arm 246B during normal operation. The reciprocating knife is connected to the forward ends of support arms 246A and 246B. The skid shoes fixed to the bottom of the reciprocating knife raise and lower the elongate reciprocating knife assembly as they follow the undulating terrain. This movement causes the support arms 246A and 246B to pivot up and down with respect to beam 200, the bracket 320 (together with identical brackets 316, 318, and 322) provide enough flexibility that the center endless belt conveyor 118 can be fixed to the support arms 246A and 246B and permit them to pivot up and down with respect to each other without the center endless belt conveyor 118 being damaged.

Furthermore, by connecting the support arms and the center conveyor using bolts 410 that are oriented in a fore-and-aft direction and are disposed in the gap between left and right side plates 304, 306 and inner facing sidewalls 312, 314, of the support arms, it is convenient to insert wrenches into the gap and to extract the bolts. This is done by removing the lock nuts and sliding the bolts forward in a direction generally parallel to the longitudinal gap between the center conveyor and the flanking support arms.

Figure 5:
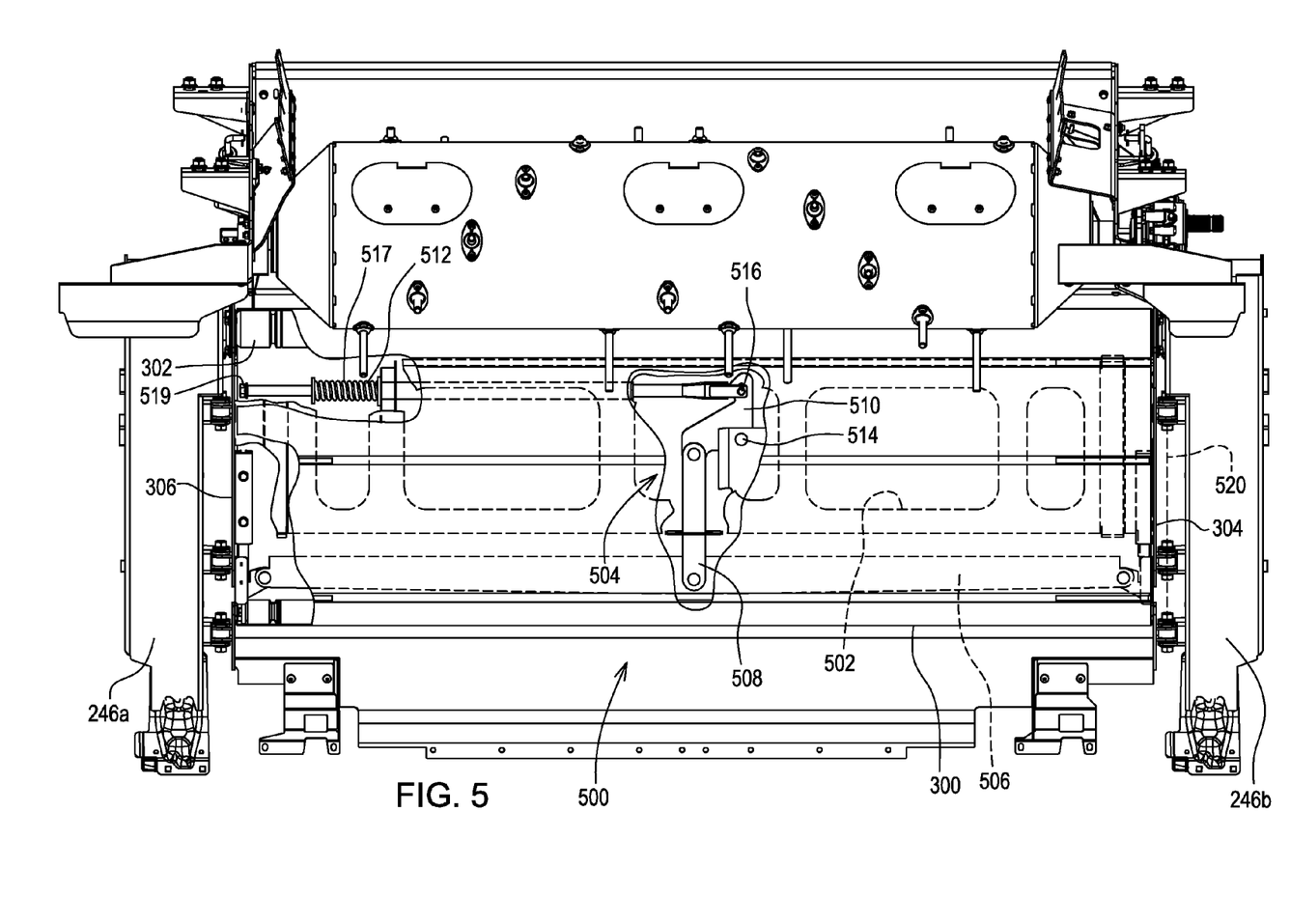
FIG. 5 is a partially cutaway plan view of the center conveyor showing the arrangement of internal members that support, tension, and drive the endless belt.

Referring now to FIG. 5, the roller support assembly 500 of center endless belt conveyor 118 is illustrated. In addition to the rollers and side plates discussed above, the center conveyor has an internal frame 502, and belt tensioner 504.

Internal frame 502 is in the form of a transversely extending member that is coupled to the two side plates 304, 306, to hold the side plates in fixed positions relative to each other. Internal frame 502 is disposed inside the loop formed by the endless belt 134 of the center endless belt conveyor 118.

Tensioner 504 includes a beam 506, a link 508, a bell crank 510, and a spring assembly 512.

Beam 506 is coupled to opposite ends of front roller 300 to apply a force to the ends of roller 300 that when tensioned by spring assembly 512, pushes front roller 300 forward and away from rear roller 302. The ends of front roller 300 are coupled to the side plates such that the front roller 300 can slide forward and backward with respect to the side plates 304, 306. Beam 506 similarly slides forward and backward with respect to the side plates as it pushes against the ends of roller 300.

Link 508 is coupled to the midpoint of beam 506 and extends between bell crank 510 and beam 506. Link 508 is pushed forward by bell crank 510. Link 508 transmits this force to beam 506. Beam 506 in turn communicates this force to the ends of roller 300, thereby pushing roller 300 forward with respect to side plates 304, 306.

Bell crank 510 is pivotally coupled to internal frame 502 at pivot point 514 such that it freely pivots around pivot point 514. Bell crank 510 changes the direction of the spring forces generated by spring assembly 512 in the transverse direction. The forces are redirected to become forces pushing forwardly on link 508.

Spring assembly 512 is coupled at one end to internal frame 502 and at the other end to a pivot joint 516 on bell crank 510. Spring assembly 512 includes a spring member, here shown as a coil compression spring 517, which, when compressed, applies the tensioning force to bell crank 510 at pivot joint 516.

Spring assembly 512 is adjustable. The amount of compression in the spring member can be changed from a first level sufficient to hold the endless belt 134 securely to rollers 300, 302, to a second level in which the roller 300 can be moved toward roller 302. At this second level of compression in spring 517, the rollers 300 and 302 are permitted to move toward each other sufficient to permit the endless belt that is supported on the rollers 300, 302 to become completely slack thereby permitting it to be removed from the rollers 300, 302 and the internal frame 502.

In the preferred embodiment, the compression of the spring 517 is varied by manipulating the spring assembly from an access hole located in the one of the side plates 304, 306. In the embodiment shown here, that access hole 521 (FIG. 6) is provided in side plate 306 immediately adjacent a head at the free end 519 of a rod carrying the compression spring 517 of the spring assembly. In the arrangement pictured herein, the operator inserts a socket wrench into the aperture, engages the socket on the socket wrench with the free end 519 of the spring assembly, and rotates it to increase or decrease the compression, if the belt tension is to be reduced (for example, when the old belt is removed), the operator rotates the free end 519 of the spring assembly in one direction to decrease the belt tensioning force. If the belt tension is to be increased (for example when the new belt is to be tensioned for use) the operator rotates the free ends of the spring assembly in the opposite direction.

To remove and replace the endless belt 134, the operator removes bolts 410 from mounting brackets 320, 322. The operator also loosens the bolts holding hydraulic motor 310 to support arm 246A which permits the motor 310 to be withdrawn away from the roller 302 thereby disengaging the motor 310 from roller 302 enough to permit the right side of center conveyor 118 to be lowered toward the ground.

At this point in the removal/replacement process the center conveyor is unsupported on its right side. Mounting brackets 316, 318 are still engaged to the center conveyor on the left hand side of the conveyor. Mounting brackets 316, 318, however, have sufficient flexibility provided by the elastomeric bushings 408 of mounting brackets 316, 318 to permit the center conveyor to pivot downward with respect to support arm 246B when the bolts 410 on mounting brackets 320, 322 (the opposing side of the center conveyor) have been removed.

The operator then pivots the center conveyor downward on its right side about pivotal axis 520 defined by the elastomeric bushing and bolts of mounting brackets 316, 318. Mounting brackets 316, 318 function like hinges and permit the right hand side of the center conveyor to drop down below the support arm 246A. This position is shown in FIG. 6 from a side view and in FIG. 7 from a front view.

Figure 6:
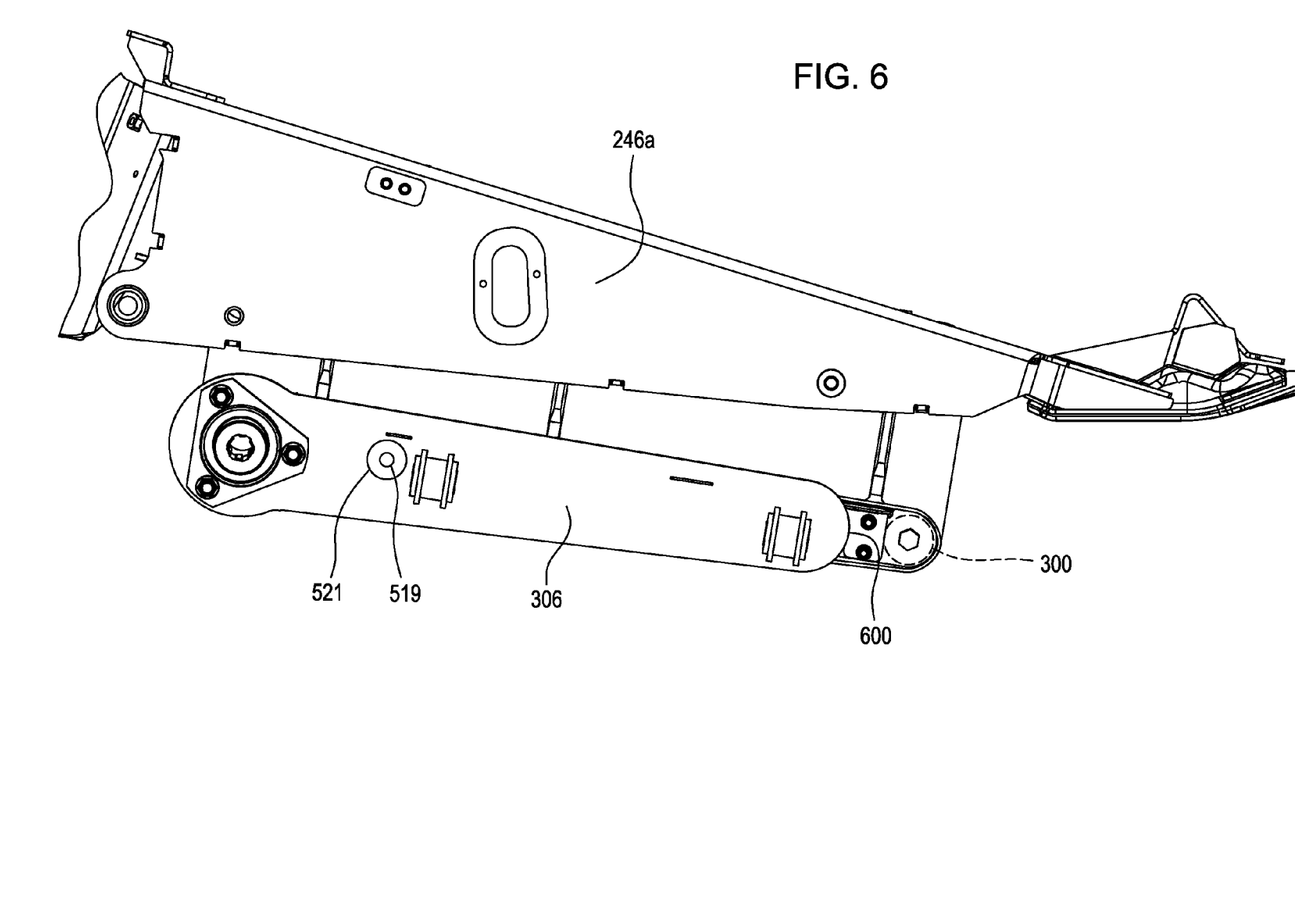
FIG. 6 is a side view of the center conveyor in its lowered position prepared for worn belt removal and installation.
Figure 7:
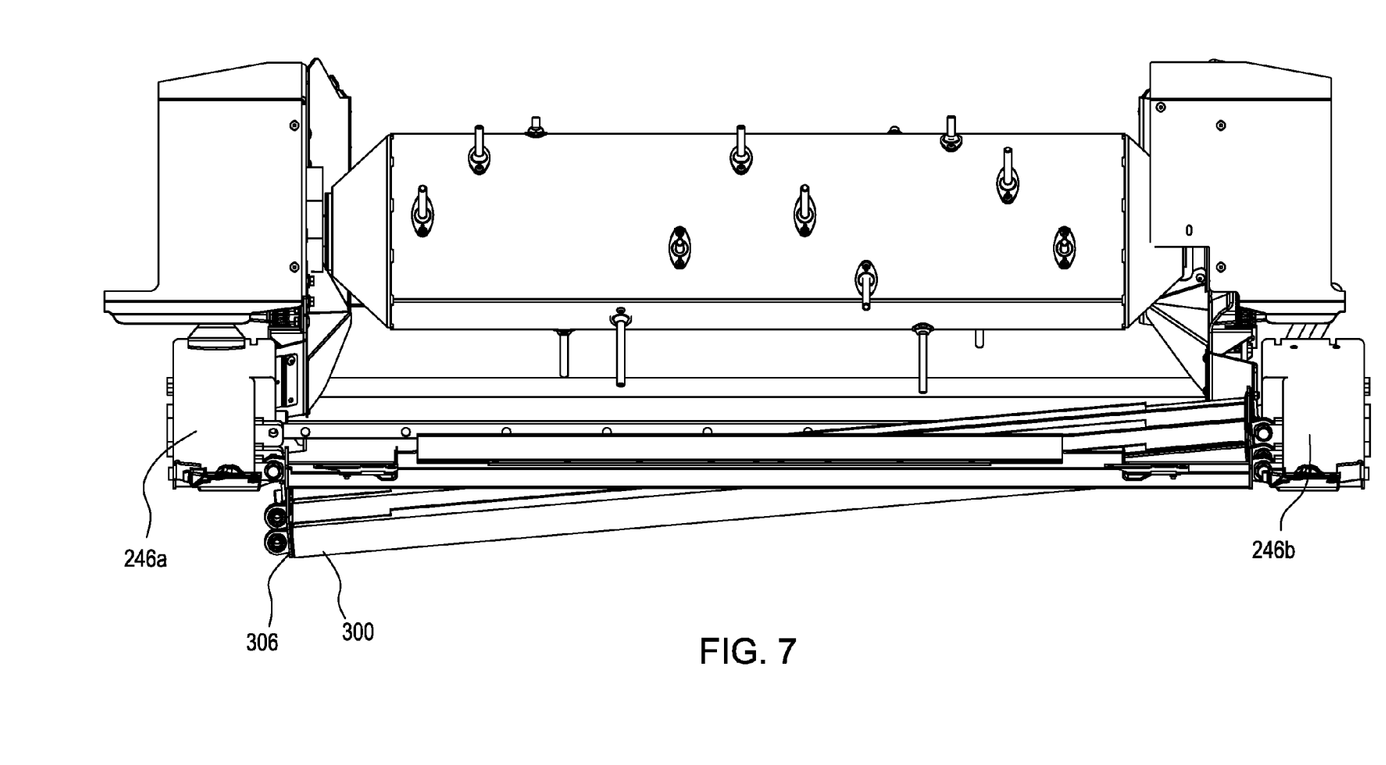
FIG. 7 is a front view of the center conveyor as shown in FIG. 6 with its left side lowered for removal of the worn belt.

Referring to FIGS. 6 and 7, the center conveyor 118 can be seen in its lowered position ready for belt replacement. Side plate 306 is exposed to permit the worn belt to be removed. The removal and replacement of the endless belt 134 (as an endless belt) without cutting through the belt or providing a joint in the belt itself is possible first because one side of the center conveyor has been easily lowered and thereby exposed, and because side plate 306 has a planar area small enough to permit the side plate 306 to pass completely through the loop of endless belt 134. When the front roller 300 is biased forwardly to remove slack from the endless belt of the center conveyor, the front roller 300 is supported on, and is cantilevered forward of, the leading edge 600 of side plate 306. This forward cantilevering permits side plate 306 to have a small enough sideways projected surface area—i.e., the area as shown in FIG. 6—such that the endless belt can be slidingly removed from the rollers 300, 302 when the rollers are moved together by the release of the belt tensioning force.

To be removed, therefore, the belt must first be loosened on rollers 300 and 302. To do this, the operator inserts a wrench through the now-exposed (in FIG. 6) access hole 521, then engages the head 519 of the tensioner and rotates it in a tension-reducing direction.

This reduces the compression of the spring 517 in spring assembly 512 from first level sufficient to hold the endless belt 134 securely to rollers 300, 302, to a second (reduced) level of compression in which the roller 300 is relaxed and moves rearward toward roller 302. With the belt tension released and roller 300 moved rearward, the friction between the endless belt 134 and the rollers 300, 302 is eliminated, the belt goes slack, and the belt can be slidingly removed.

The endless belt 134 has a greater length than the length of the outer edge of the side plate 306. Since it has this greater length, the endless belt 134 can slide off the side plate 306 without interference.

In a preferred arrangement, roller 300 can be released and withdrawn rearward far enough to let the endless belt 134 hang loosely on rollers 300, 302. This much slack is not a requirement, however.

What is claimed is:

1. A draper platform (100) having a direction of travel through a field ("V") and a leading edge, comprising:
    an elongate frame (102, 104, 106), said frame being elongate and disposed to carry crop in a direction transverse to the direction of travel through the field;
    a plurality of support arms (246) pivotally coupled to the frame and extending forward therefrom;
    a reciprocating knife (140) disposed at the leading edge of the draper platform and extending substantially the entire width of the draper platform;
    a left side conveyor (116) disposed behind the reciprocating knife and supported on a first plurality of the support arms and having an endless belt (122, 124, 126) disposed to carry crop from the left side of the draper platform to a central region of the draper platform;
    a right side conveyor (120) disposed behind the reciprocating knife and supported on a second plurality of the support arms and having an endless belt (128, 130, 132) disposed to carry crop from the right side of the draper platform to a central region of the draper platform;
    a center conveyor (118) disposed between the left side conveyor and the right side conveyor and supported on two adjacent support arms (246A, 246B) of the plurality of support arms located between said first and second plurality of the support arms, said center conveyor having an endless conveyor belt (134) supported at least on parallel front and rear rollers respectively having transverse axes and about which the endless conveyor belt forms a loop and may rotate to carry crop in a direction opposite to the direction of travel;
    a first connection assembly releasably connecting a first side of the center conveyor (118) to one of the two adjacent support arms (246A, 246B) and a second connection assembly movably connecting a second side of the conveyor (118) to another of the two adjacent support arms permitting the first side of the conveyor (118), when the first connection assembly is released, to move downward relative to the second side of the conveyor, as permitted by the second connection assembly, and thus downward away from the first support arm of the two adjacent support arms a distance sufficient to permit the endless conveyor belt to be removed from the center conveyor in a direction parallel to the axes.

2. The draper platform (100) of claim 1, wherein each of said first and second connection assemblies includes first and second mounting brackets supporting the first side of the center conveyor on the first support arm and supporting the second side of the center conveyor on the second support arm;
    each of said first and second mounting brackets of said first connection assembly comprising a first coupler (400) fixed to the first support arm and a second coupler (412), fixed to the conveyor, and at least one removable coupling member (410) coupling the first and second couplers together.

3. The draper platform (100) of claim 2, wherein the first and second couplers each include a pair of vertical, transverse ears (402, 404 and 414, 416) and the at least one coupling member (410) is releasably received in the pair of ears of both the first and second couplers to hold the first and second couplers together.

4. The draper platform (100) of claim 2, wherein the second connection assembly is similar to the first connection assembly and includes third and fourth mounting brackets supporting the second side of the center conveyor on the second support arm (246B);
- each of said third and fourth brackets comprising a third coupler fixed to the second support arm, end a fourth coupler fixed to the second side of the center conveyor; and
- at least a second coupling member pivotally coupling the third and fourth couplers to each other to permit the central conveyor to pivot with respect to the second support arm about a pivotal axis immediately adjacent to at least a portion of the third and fourth brackets.

5. The draper platform (100) of claim 4, wherein the pivotal axis passes through the third bracket and the fourth bracket.

6. The draper platform (100) of claim 1, wherein the center conveyor further comprises an internal frame (502) located within the loop of the endless conveyor belt;
- a roller support assembly (500) located within the loop of the endless conveyor belt and mounted to said internal frame for fore-and-aft movement relative to said internal frame;
- said front roller being mounted to said roller support assembly;
- a belt tensioner (504) disposed inside the loop of the endless conveyor belt and coupled between said internal frame and said roller support assembly and including an adjustable biasing spring assembly (512) mounted for exerting a biasing force on said front roller and being adjustable between a first level, establishing a tension in said endless conveyor belt for holding the endless belt securely to the front and rear rollers, and a second level, less than said first level, for permitting the front roller to move toward said rear roller such that the endless belt becomes sufficiently slack so as to permit the endless conveyor belt to be removed from the center conveyor, after disconnecting the first connection assembly and moving the first side of the endless conveyor downward, by translating the endless conveyor belt in a direction parallel to the longitudinal extent of the front and rear rollers a distance of at least the overall transverse width of the endless conveyor belt.

7. A draper platform (100) having a direction of travel through a field ("V") and a leading edge, comprising:
- an elongate frame (102, 104, 106) disposed transverse to the direction of travel through the field;
- support arms (246) pivotally coupled to the frame and extending forward therefrom;
- a reciprocating knife (140) disposed at the leading edge of the draper platform and extending substantially the entire width of the draper platform;
- a left side conveyor (116) disposed behind the reciprocating knife and supported on a first plurality of the support arms and having an endless belt (122, 124, 126) disposed to carry crop from the left side of the draper platform to a central region of the draper platform;
- a right side conveyor (120) disposed behind the reciprocating knife and, supported on a second plurality of the support arms and having an endless belt (128, 130, 132) disposed to carry crop from the right side of the draper platform to a central region of the draper platform;
- a center conveyor (118) disposed between the left side conveyor and the right side conveyor and supported on two adjacent support arms (246A, 246B), said center conveyor having an endless conveyor belt (134) supported on front and rear ropers, respectively, having parallel axes disposed transverse to the direction of travel, to carry crop in a direction opposite to the direction of travel;
- first and second mounting brackets (320 and 322) each including a first coupler (400) fixed to a first side the center conveyor (118) and a second coupler (412) fixed to a first of two adjacent support arms (246A,246B);
- at least one coupling member (410) being removably connected to the first and second couplers for selectively releasing the first side of the center conveyor from the first of the two adjacent support arms; and
- said second coupler being spaced apart from the first coupler to pivot downward with respect to the first coupler when the at least one coupling member is removed.

8. In a draper platform (100) having a direction of travel, a left side and a right side, said draper platform (100) comprising an elongate draper frame (102, 104, 106) extending in a direction transverse to the direction of travel, said draper platform (100) further comprising a left side conveyor (116) having an endless belt arrangement disposed for carrying crop from the left side of the draper platform to a central region of the draper platform, a right side conveyor (120) having an endless belt arrangement disposed for carrying crop from the right side of the draper platform to the central region of the draper platform, and a center conveyor (118), said left side, right side and center conveyors being supported on said draper frame (102, 104, 106), wherein said center conveyor is disposed at said central region between the left side conveyor and the right side conveyor to receive cut crop material from both the left side conveyor and the right side conveyor, wherein the center conveyor has two transversely opposed sides comprising a left side and a right side, wherein said center conveyor further comprises a conveyor frame (502), a front roller (300) and a rear roller (302) supported on the conveyor frame and an endless belt (134) supported on the front and rear rollers for recirculating movement about the front and rear rollers, wherein the front and rear rollers rotate about axes that extend parallel to the transverse extent of the frame, a method of replacing the endless belt (134) comprising the steps of:
- establishing a releasable connection between one of said left and right sides of the center conveyor and the draper frame and establishing a pivotal connection between another of said left and right sides of the center conveyor and the draper frame which defines a pivotal axis (520) that extends generally parallel to the direction of travel;
- releasing said one of said left side and right side of the center conveyor from the draper frame (102, 104, 100);
- pivoting the center conveyor (118) with respect to the draper frame (102, 104, 106) about the pivotal axis (520) that extends generally parallel to the direction of travel; and
- removing the endless belt (134), while said endless belt is in the form of an endless loop and while said another of said right and left sides of the center conveyor remains pivotally connected to said draper frame, by sliding the endless belt transversely from said front and rear rollers.

9. The method of claim 8, wherein a drive motor is releasably drivingly couples directly to one of left and right ends of said rear roller and is releasably secured to said draper frame, and wherein the step of releasing the one of said left side and right side of the center conveyor further comprises the step of disconnecting said drive motor from the draper frame and the one of left and right ends of said rear roller to thereby completely disconnect the one of said right side and left side of the center conveyor (118) from the draper frame.

10. The method of claim 8, wherein the step of removing the endless belt (134) further comprises the step of retracting the front roller (300) toward the rear roller (302) until tension is released in the endless belt.

11. The method of claim 8, wherein the center conveyor includes an internal frame located within the loop defined by the endless conveyor belt, and wherein the step of removing the endless belt (134) further comprises the step of sliding the endless belt completely off the internal frame, and front and rear rollers in a direction toward the one of said left side and right side of the center conveyor.

12. The method of claim 8, wherein the draper platform frame includes a frame member disposed in confronting relationship to, the one of said left side and right side of the center conveyor, with the releasable connection being with said frame member, and the step of pivoting the center conveyor (118) includes the step of pivoting the center conveyor until the one of said left side and right side of the center conveyor clears the frame member sufficient that the endless belt can be slid off the center conveyor rollers in a direction parallel to the axes of rotation of the front and rear rollers (300, 302).

13. The method of claim 8, wherein the draper platform frame includes a frame member disposed in confronting relationship to the one of said left side and right side of the center conveyor, with the releasable connection being with said frame member, and wherein the step of pivoting the center conveyor (118) includes the step of pivoting the center conveyor downward until the one of said left side and right side of the center conveyor clears the frame member sufficiently that the endless belt can be slid off the center conveyor rollers in a direction parallel to the axes of rotation of the front and rear rollers (300, 302) through a distance at least as great as an overall width of the endless belt in the direction parallel to the axes of rotation.

* * * * *